(12) United States Patent
Subrahmanyam et al.

(10) Patent No.: US 6,972,922 B1
(45) Date of Patent: Dec. 6, 2005

(54) DISK DRIVE HAVING INTERNAL DATA STRUCTURES FOR EFFICIENTLY STORING REPEATABLE RUNOUT CANCELLATION INFORMATION

(75) Inventors: Jai N. Subrahmanyam, Santa Clara, CA (US); Jack M. Chue, Los Altos, CA (US); Robert J. McNab, San Jose, CA (US)

(73) Assignee: Western Digital Technologies, Inc., Lake Forset, CA (US)

( * ) Notice: Subject to any disclaimer, the term of this patent is extended or adjusted under 35 U.S.C. 154(b) by 212 days.

(21) Appl. No.: 10/360,206

(22) Filed: Feb. 7, 2003

(51) Int. Cl.⁷ .............................................. G11B 5/596
(52) U.S. Cl. .................................................. 360/77.04
(58) Field of Search ......................... 360/77.08, 77.04, 360/73.02, 77.02, 75, 78.04, 78.09, 77.05, 360/77.07, 77.11

(56) References Cited

U.S. PATENT DOCUMENTS

| | | | |
|---|---|---|---|
| 5,825,578 A | | 10/1998 | Shrinkle et al. |
| 5,880,902 A | * | 3/1999 | Yu et al. ................... 360/77.04 |
| 5,923,491 A | * | 7/1999 | Kisaka et al. ............. 360/77.04 |
| 5,949,605 A | * | 9/1999 | Lee et al. ................. 360/77.04 |
| 5,995,316 A | * | 11/1999 | Stich ........................ 360/77.04 |
| 5,999,357 A | * | 12/1999 | Serrano .................... 360/73.02 |
| 6,049,440 A | * | 4/2000 | Shu .......................... 360/77.04 |
| 6,141,175 A | | 10/2000 | Nazarian et al. |
| 6,310,742 B1 | * | 10/2001 | Nazarian et al. ......... 360/77.04 |
| 6,487,035 B1 | * | 11/2002 | Liu et al. .................. 360/77.04 |
| 6,493,173 B1 | | 12/2002 | Kim et al. |
| 6,545,835 B1 | * | 4/2003 | Codilian et al. .......... 360/77.04 |
| 6,549,362 B1 | * | 4/2003 | Melrose et al. ........... 360/77.04 |
| 6,574,067 B2 | * | 6/2003 | Chen et al. ............... 360/77.04 |
| 6,661,599 B1 | * | 12/2003 | Chen et al. ............... 360/77.04 |
| 6,707,635 B1 | * | 3/2004 | Codilian et al. .......... 360/77.04 |
| 6,765,748 B2 | * | 7/2004 | Shu .......................... 360/77.04 |

* cited by examiner

Primary Examiner—David Hudspeth
Assistant Examiner—Fred F. Tzeng
(74) Attorney, Agent, or Firm—Robroy R. Fawcett, Esq.

(57) ABSTRACT

A disk drive includes a sampled servo controller for periodically adjusting a control effort signal during a track-following operation based on embedded distributed position information and repeatable runout (RRO) cancellation values for reducing effects of RRO in the distributed position information during track following. A magnetic disk in the disk drive stores RRO information relating to predetermined RRO cancellation values for a data storage track. The RRO information for the data storage track includes at least one first data structure having a first predetermined number of data bits for representing an initial RRO cancellation value, and includes at least one second data structure having a second predetermined number of data bits associated with a respective subsequent RRO cancellation value. The first predetermined number of data bits is greater than the second predetermined number of data bits.

15 Claims, 5 Drawing Sheets

| | | | | | | | | |
|---|---|---|---|---|---|---|---|---|
| SERVO SECTOR 1 | PREAMBLE | TRACK ID | A | B | C | D | $RDS_1$ | ECC |
| SERVO SECTOR 2 | PREAMBLE | TRACK ID | A | B | C | D | $RDS_2$ | ECC |
| SERVO SECTOR 3 | PREAMBLE | TRACK ID | A | B | C | D | $RDS_3$ | ECC |
| SERVO SECTOR 4 | PREAMBLE | TRACK ID | A | B | C | D | $RDS_4$ | ECC |
FIG. 4
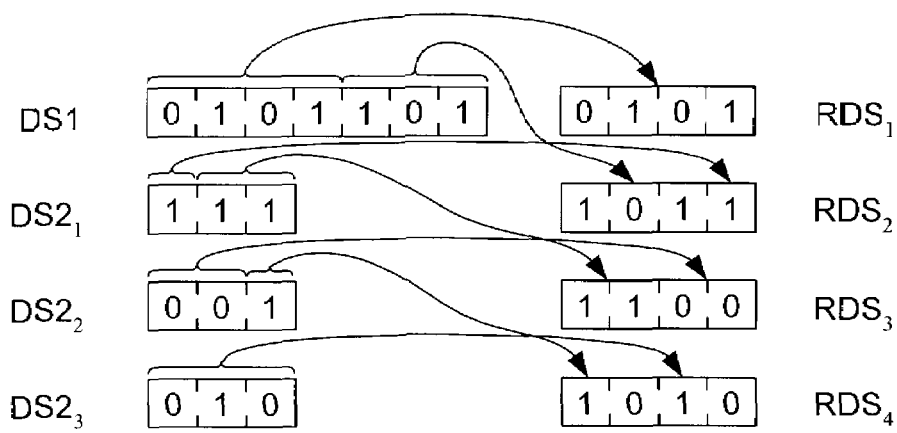
FIG. 5A
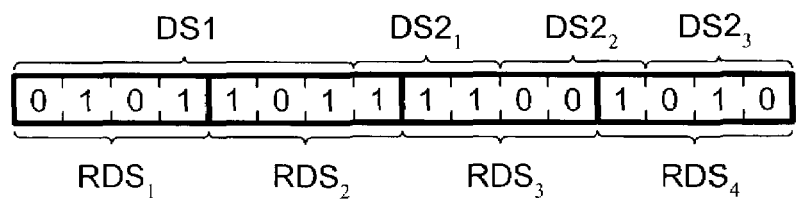
FIG. 5B

IDEAL SERVO TRACKS

WRITTEN SERVO TRACKS

DISK DRIVE HAVING INTERNAL DATA STRUCTURES FOR EFFICIENTLY STORING REPEATABLE RUNOUT CANCELLATION INFORMATION

BACKGROUND OF THE INVENTION

1. Field of the Invention

The present invention relates to rotating magnetic disk drives, and more particularly, to a disk drive having internal data structures for efficiently storing repeatable runout cancellation information.

2. Description of the Prior Art and Related Information

With reference to FIGS. 8A and 8B, repeatable runout (RRO) in a disk drive results from imperfections, with respect to a perfect circle, in the location of servo information 82 along a track 20 on a disk surface in the disk drive. During track following, the RRO imperfections have a detrimental effect on efforts by a head-position servo control loop to cause a transducer head to follow a perfect circle. The RRO imperfections are relatively static over time and the effect of the RRO may be attenuated by measuring the RRO and storing resulting RRO cancellation values for later use by the head-position servo loop to compensate for the RRO. However, the amount of RRO cancellation information may be substantial and may affect the user data storage capacity of the disk drive.

Accordingly, there exists a need for a technique for efficiently and reliably storing the RRO cancellation information for significantly reducing the effects of RRO in a disk drive.

SUMMARY OF THE INVENTION

The present invention may be embodied in a magnetic disk drive having a head disk assembly (HDA) and a sampled servo controller. The HDA includes a rotating magnetic disk having distributed position information in a plurality of uniformly spaced-apart servo wedges for defining data storage tracks, and includes an actuator for positioning a transducer head in response to a control effort signal. The transducer head is for periodically reading the position information from the servo wedges and reading data from the data storage tracks. The sampled servo controller is for periodically adjusting the control effort signal during a track-following operation based on the position information and repeatable runout (RRO) cancellation values. The magnetic disk stores RRO information relating to predetermined RRO cancellation values, for at least one data storage track, for reducing effects of RRO in the distributed position information during track following of the respective data track. The RRO information for the at least one data storage track includes at least one first data structure having a first predetermined number of data bits for representing an initial RRO cancellation value, and includes at least one second data structure having a second predetermined number of data bits associated with a respective subsequent RRO cancellation value. The first predetermined number of data bits is greater than the second predetermined number of data bits.

In more detailed features of the invention, the initial RRO cancellation value may comprise a base RRO cancellation value for a respective data storage track. Each second data structure may store an offset value for calculating the respective subsequent RRO cancellation value using the offset value and the base RRO cancellation value. The initial RRO cancellation value may be associated with a first servo wedge for a respective data storage track. Each second data structure may store an offset value for calculating the respective subsequent RRO cancellation value using the offset value and an immediately preceding RRO cancellation value. More particularly, the first data structure may be stored in an index sector of a respective data storage track, and each second data structure may stored in a respective non-index sector of the data storage track.

In other more detailed features of the invention, more than one initial RRO cancellation value may be associated with each data storage track. Each of the more than one initial RRO cancel lation value may comprise a base RRO cancellation value for a corresponding portion of the data storage track. Each second data structure may store an offset value for calculating the respective RRO cancellation values using the offset value and an immediately preceding RRO cancellation value. Alternatively, each second data structure may store an offset value for calculating the respective subsequent RRO cancellation value using the offset value and the base RRO cancellation value for the corresponding portion of the data storage track. Each base RRO cancellation value may be a mean, median, mode or range midpoint of the RRO cancellation values for the corresponding portion of the data storage track.

In other more detailed features of the invention, for a respective data track, each servo wedge may be associated with a respective servo sector that includes an RRO data segment. Each RRO data segment may have a substantially uniform number of storage bits. The data bits for the first and second data structures of the respective data track may be catenated together and stored in the RRO data segments such that the number of data bits stored in each RRO data segment is relatively uniform. Also, the RRO information may include error correction code for detecting and correcting at least one error in at least one predetermined RRO cancellation value.

BRIEF DESCRIPTION OF THE DRAWINGS

The accompanying drawings illustrate embodiments of the present invention and, together with the description, serve to explain the principles of the invention.

FIG. 4 is a schematic diagram of servo sectors having RRO data segments for storing the first and second data structures.

FIGS. 5A and 5B are schematic diagrams showing catenated first and second data structures for storage in the RRO data segments.

FIG. 5A is a schematic diagram illustrating ideal servo tracks on a disk of a disk drive.

DETAILED DESCRIPTION

Figure 1:
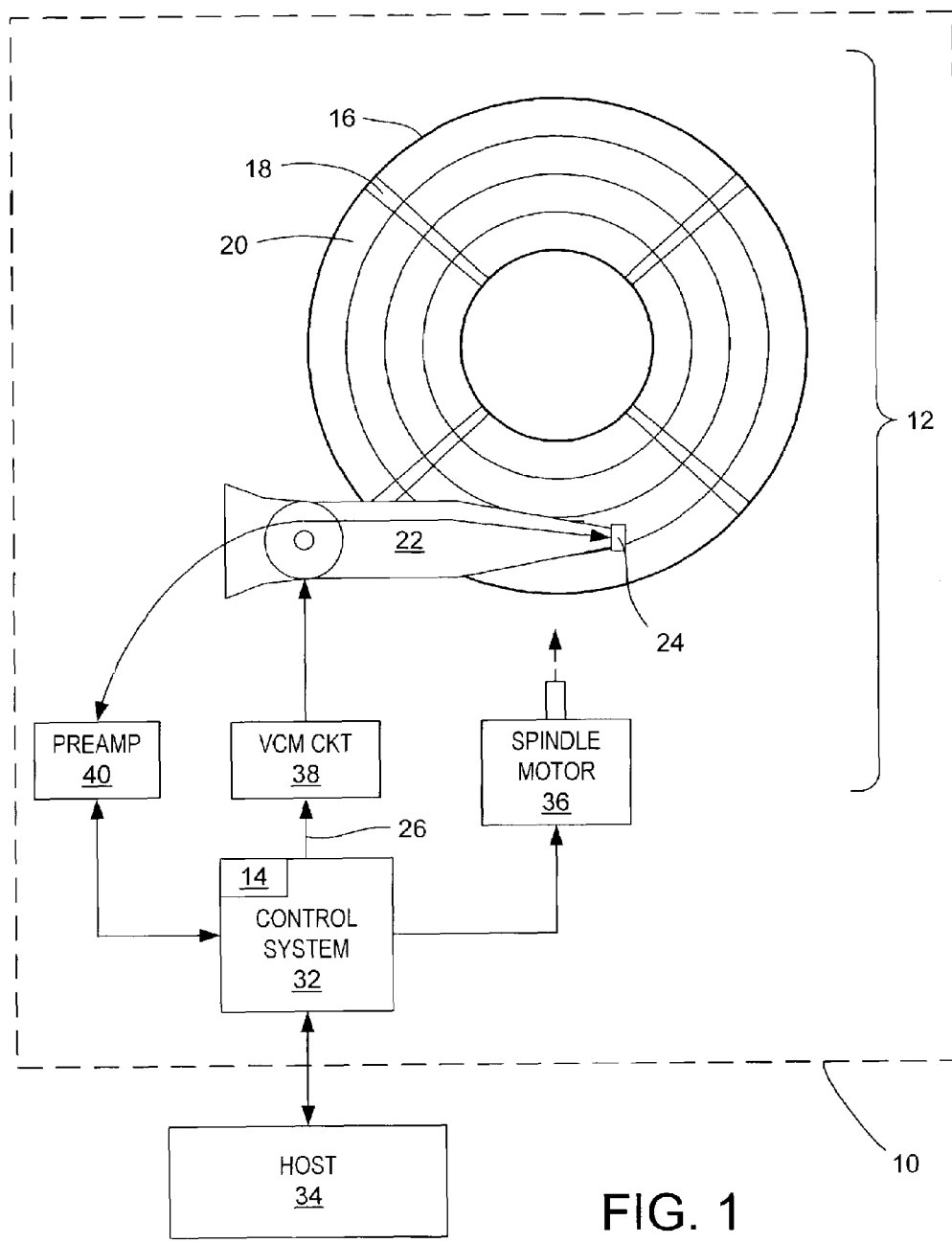
FIG. 1 is a block diagram of a computer system including a disk drive having internal data structures for efficiently storing repeatable runout (RRO) cancellation information, according to the present invention.
Figure 2:
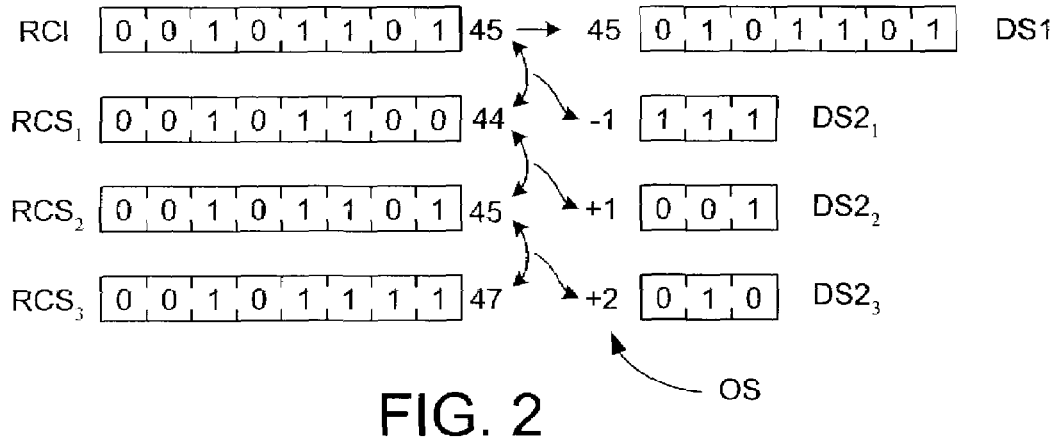
FIG. 2 is a schematic diagram of first and second data structures for storing the RRO cancellation information, according to the present invention.

With reference to FIGS. 1 and 2, the present invention may be embodied in a magnetic disk drive 10, having a head disk assembly (HDA) 12 and a sampled servo controller 14. The HDA includes a rotating magnetic disk 16 having distributed position information in a plurality of uniformly spaced-apart servo wedges 18 for defining data storage tracks 20, and includes an actuator 22 for positioning a transducer head 24 in response to a control effort signal 26. The transducer head is for periodically reading the position information from the servo wedges and reading data from the data storage tracks. The sampled servo controller is for periodically adjusting the control effort signal during a track-following operation based on the position information and repeatable runout (RRO) cancellation values. The magnetic disk stores RRO information relating to predetermined RRO cancellation values, for at least one data storage track, for reducing effects of RRO in the distributed position information during track following of the respective data track. As shown in FIG. 2, the RRO information for the data storage track includes at least one first data structure DS1 having a first predetermined number of data bits for representing an initial RRO cancellation value RCI, and includes at least one second data structure DS2 having a second predetermined number of data bits associated with a respective subsequent RRO cancellation value RCS. The first predetermined number of data bits (e.g., 7 bits) is greater than the second predetermined number of data bits (e.g., 3 bits).

Figure 8A:
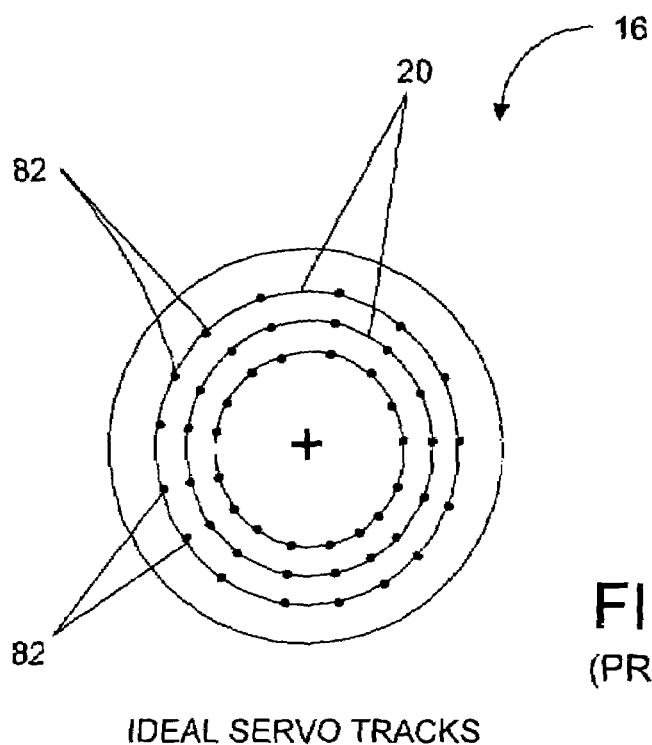
FIG. 8B is a schematic diagram illustrating written servo tracks exhibiting servo RRO.
Figure 8B:
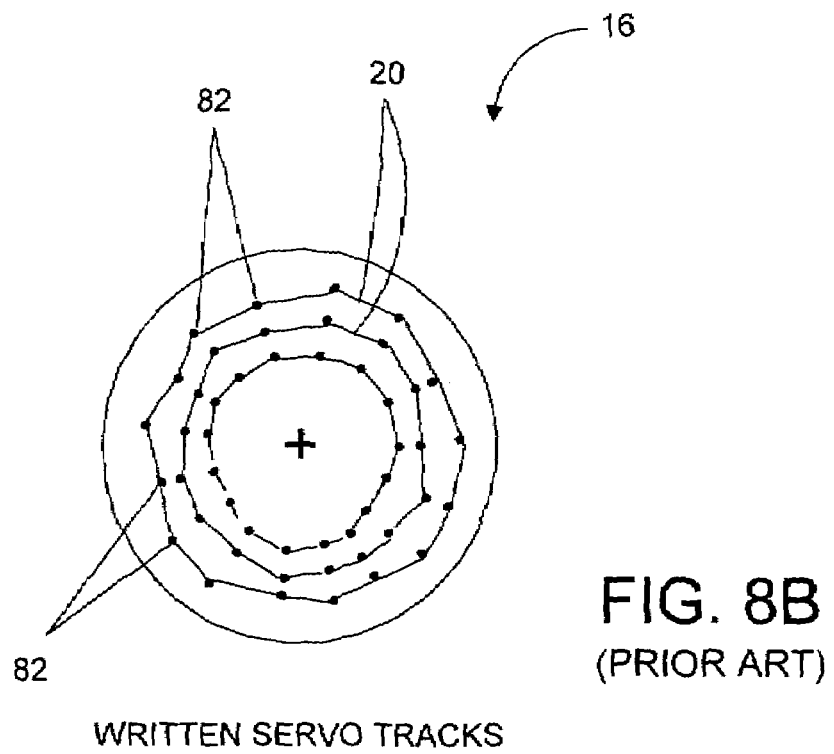

The use of a second data structure DS2 having a reduced number of data bits allows efficient storage of information related to the subsequent RRO cancellation values RCS. The RRO imperfections in the servo wedge position information may constitute nearly 50% of total position error signal (PES) variance in a disk drive 10 having high track pitch. Cancellation of the RRO is desired to improve drive performance and achieve higher track densities. With reference again to FIGS. 8A and 8B, an ideal track 20 is one that forms a perfect circle on the disk 16 as shown in FIG. 8A. During manufacture, the embedded servo information 82 is placed on the disk during a servo writing operation. The servo information 82 includes servo bursts that are placed at locations that may deviate outwardly or inwardly from the ideal "center line" of the track circle as shown in FIG. 8B. These apparent deviations from the ideal track center line can occur due to spindle runout, vibrations or movements during servo writing operation, and media defects or noise in the region of the servo bursts.

In order to effectively reduce the number of data bits in the second data structure DS2, the initial RRO cancellation value RCI may be a base RRO cancellation value for the respective data storage track 20. In FIG. 2, the initial RRO cancellation value is 45. Each second data structure DS2 may store the offset value OS for calculating the respective subsequent RRO cancellation value RCS using the offset value and an immediately preceding RRO cancellation value such that $RCS_1=RCI+OS_1$, and $RCS_n=RCS_{n-1}+OS_n$ for n greater than 1. In FIG. 2, the first, second, and third subsequent RRO cancellation values are 44, 45 and 47, respectively. These values differ from the initial value by the following offset values: −1, +1, and +2, respectively. The offset values may be represented by the two's complement of the value to accommodate negative values.

Figure 3:
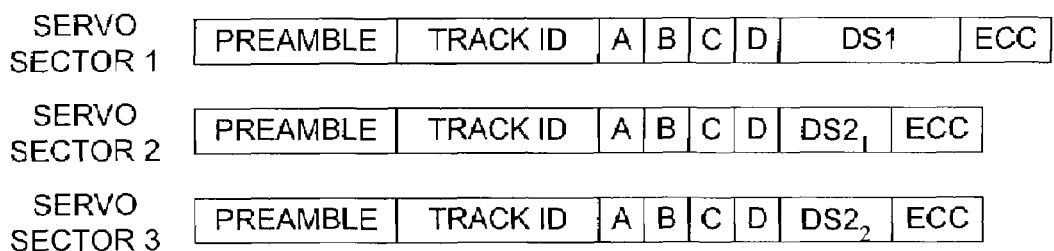
FIG. 3 is a schematic diagram of servo sectors having the first and second data structures.

With reference to FIG. 3, the servo wedges 18, with respect to a particular data storage track 20, may be viewed as servo sectors. Each servo sector would consist of a preamble, a track identification number (ID), servo bursts A, B, C and D, and the corresponding data structure DS1 or DS2. Accordingly, the first data structure DS1 may be stored in a first or an index sector of the data storage track, and each second data structure DS2 may stored in a respective non-index sector of the data storage track. Also, the RRO information may includes error correction code (ECC) for detecting and correcting at least one error in at least one predetermined RRO cancellation value.

With reference to FIG. 4, each servo sector may include an RRO data segment RDS having a substantially uniform number of storage bits. The data bits for the first and second data structures, DS1 and DS2, of the respective data track may be catenated together, as shown in FIGS. 5A and 5B. The catenated data bits (e.g., 16 bits) may be divided and stored in the RRO data segments such that the number of data bits stored in each RRO data segment is relatively uniform (e.g., 4 bits).

Figure 6:
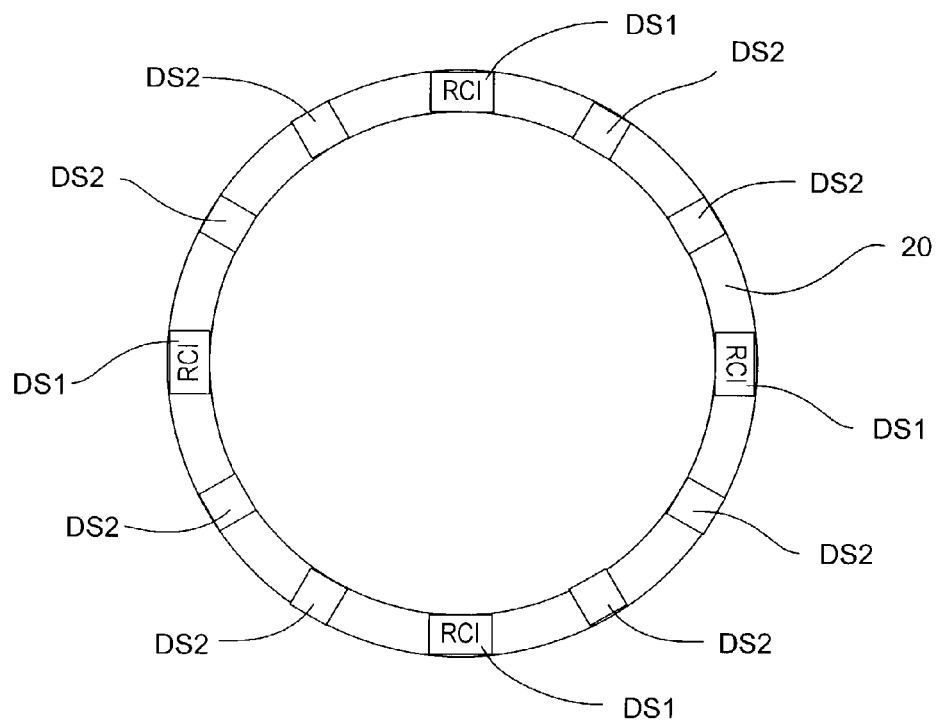
FIG. 6 is a schematic diagram of a data storage track having more than one initial RRO cancellation value.

With reference to FIG. 6, a data storage track 20 may have more than one initial RRO cancellation value RCI. Each initial RRO cancellation value of the data storage track may comprise a base RRO cancellation value RCB for a portion of the data storage track. The base RRO cancellation value may be a mean, median, mode, or other value determined using a statistical metric. For example, the mean RRO cancellation value may be determined by the following equation:

$$RCB = \left(RCI + \sum_n RCS_n\right) \bigg/ (n+1).$$

Similarly, the base RRO cancellation value may be a value at a midpoint between a highest RRO cancellation value and a lowest cancellation value for the portion of the data storage track. Each first data structure, in addition to storing the base RRO cancellation value, may store an initial offset value OSI. Accordingly the initial RRO cancellation value may be calculated by the following formula: RCI=RCB+OSI. The subsequent RRO cancellation values RCS may be calculated using the base RRO cancellation value and the respective offset value OS such that $RCS_n=RCB+OS_n$.

As an example, RRO cancellation values of 90, 85, 110, 115, and 115 would result in a mean of 103, a median of 110, a mode of 115, and a range midpoint of 100. If the range midpoint of 100 was selected to be the base RRO cancellation value RCB, then the initial offset value OSI would be −10. Both the range midpoint and the initial offset value would be included in the first data structure DS1. The remaining offset values OS would be −15, 10, 15, and 15, which values would be represented in second data structures DS2.

With reference again to FIG. 1, the disk drive further has a control system 32. The control system includes the sampled servo controller 14, and circuitry and processors that control a head-disk assembly (HDA) 12 and that provide an intelligent interface between a host 34 and the HDA for execution of read and write commands. The control system may have an internal microprocessor and nonvolatile memory for implementing the techniques related to the invention. Program code for implementing these techniques may be stored in the nonvolatile memory and transferred to volatile random access memory (RAM) for execution by the microprocessor. The HDA further includes a spindle motor 36, at least one disk 16, the actuator 22, a voice coil motor (VCM) circuit 38 coupled between the actuator and the sampled servo controller of the control system, and a preamplifier 40 coupled between the transducer head 24 and the control system.

The magnetic media surface of the disk 16 is accessed using the head 24. The tracks 20 on the media surface may be divided into the storage segments. Each storage segment typically begins with a servo sector which is followed by data sectors. The servo sector for a storage segment corresponds to an intersection with the radially-extending embedded servo wedges 18. The data sectors may include data blocks, each generally storing 512 data bytes. Each data block may be addressed using a logical block address (LBA).

Figure 7:
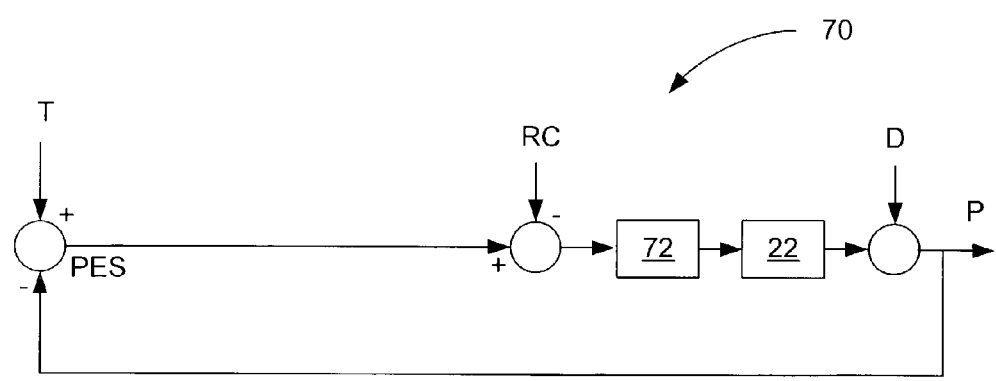
FIG. 7 is a block diagram of a servo control loop, within the disk drive of FIG. 1, for using the RRO values to reduce the effects, of RRO during track following operations.

With reference to FIG. 7, a servo control loop 70, implemented by the sampled servo controller 14, includes the actuator 22 after a track following compensator 72. Disturbances D to the actuator alter the resulting head position P. A track selection signal T is compared to the head position P to generate a position error signal PES. For track following during disk operations, the RRO cancellation values RC modify the PES to reduce the effect of the RRO.

What is claimed is:

1. A magnetic disk drive, comprising:
   a head disk assembly (HDA) including a rotating magnetic disk having distributed position information in a plurality of uniformly spaced-apart servo wedges for defining data storage tracks, and including an actuator for positioning a transducer head in response to a control effort signal, the transducer head for periodically reading the position information from the servo wedges and reading data from the data storage tracks; and
   a sampled servo controller for periodically adjusting the control effort signal during a track-following operation based on the position information and repeatable runout (RRO) cancellation values;
   wherein the magnetic disk stores RRO information relating to predetermined RRO cancellation values, for at least one data storage track, for reducing effects of RRO in the distributed position information during track following of the respective data track, the RRO information for the at least one data storage track including at least one first data structure having a first predetermined number of data bits for representing an initial RRO cancellation value, and including at least one second data structure having a second predetermined number of data bits associated with a respective subsequent RRO cancellation value, the first predetermined number of data bits being greater than the second predetermined number of data bits.

2. A magnetic disk drive as defined in claim 1, wherein the initial RRO cancellation value comprises a base RRO cancellation value for a respective data storage track, and each second data structure stores an offset value for calculating the respective subsequent RRO cancellation value using the offset value and the base RRO cancellation value.

3. A magnetic disk drive as defined in claim 1, wherein the initial RRO cancellation value is associated with a first servo wedge for a respective data storage track, and each second data structure stores an offset value for calculating the respective subsequent RRO cancellation value using the offset value and an immediately preceding RRO cancellation value.

4. A magnetic disk drive as defined in claim 1, wherein the first data structure is stored in an index sector of a respective data storage track, and each second data structure is stored in a respective non-index sector of the data storage track.

5. A magnetic disk drive as defined in claim 1, wherein more than one initial RRO cancellation value is associated with each data storage track.

6. A magnetic disk drive as defined in claim 5, wherein each of the more than one initial RRO cancellation value comprises a base RRO cancellation value for a corresponding portion of the data storage track.

7. A magnetic disk drive as defined in claim 6, wherein each second data structure stores an offset value for calculating the respective subsequent RRO cancellation value using the offset value and an immediately preceding RRO cancellation value.

8. A magnetic disk drive as defined in claim 6, wherein each second data structure stores an offset value for calculating the respective subsequent RRO cancellation value using the offset value and the base RRO cancellation value for the corresponding portion of the data storage track.

9. A magnetic disk drive as defined in claim 6, wherein each base RRO cancellation value is a mean of the RRO cancellation values for the corresponding portion of the data storage track.

10. A magnetic disk drive as defined in claim 6, wherein each base RRO cancellation value is a median of the RRO cancellation values for the corresponding portion of the data storage track.

11. A magnetic disk drive as defined in claim 6, wherein each base RRO cancellation value is a mode of the RRO cancellation values for the corresponding portion of the data storage track.

12. A magnetic disk drive as defined in claim 6, wherein each base RRO cancellation value is a midpoint of a range of the RRO cancellation values for the corresponding portion of the data storage track.

13. A magnetic disk drive as defined in claim 1, wherein, for a respective data track, each servo wedge is associated with a respective servo sector that includes an RRO data segment, each RRO data segment having a substantially uniform number of storage bits, and wherein the data bits for the first and second data structures of the respective data track are catenated together and stored in the RRO data segments such that the number of data bits stored in each RRO data segment is relatively uniform.

14. A magnetic disk drive as defined in claim 1, wherein the RRO information includes error correction code for detecting at least one error in at least one predetermined RRO cancellation value.

15. A magnetic disk drive as defined in claim 1, wherein the RRO information includes error correction code for correcting at least one error in at least one predetermined RRO cancellation value.

\* \* \* \* \*